United States Patent [19]

Klein

[11] 4,344,775
[45] * Aug. 17, 1982

[54] METHOD FOR SEPARATING GASES LIQUID DROPLETS AND/OR SOLID PARTICLES FROM GASES OR VAPORS

[75] Inventor: Max Klein, P.O. Box 3, Dalton, Mass. 01226

[73] Assignee: Max Klein, Shrewsbury, N.J.

[*] Notice: The portion of the term of this patent subsequent to Dec. 16, 1997, has been disclaimed.

[21] Appl. No.: 216,953

[22] Filed: Dec. 16, 1980

Related U.S. Application Data

[63] Continuation-in-part of Ser. No. 18,472, Mar. 8, 1979, which is a continuation-in-part of Ser. No. 877,190, Feb. 13, 1978, abandoned.

[51] Int. Cl.³ .............................................. B01D 53/02
[52] U.S. Cl. .................................... 55/75; 55/97; 55/524; 55/527; 55/528; 210/504; 162/145; 162/146; 162/181.7; 428/283; 252/430; 252/428
[58] Field of Search .............. 55/74, 75, 274, 316, 55/387, 522–528, DIG. 13, 97; 252/428, 430, 444, 450; 131/201–203, 207; 210/502, 504; 162/145, 146, 181.9, 181.7; 428/292, 283, 317, 311

[56] References Cited

U.S. PATENT DOCUMENTS

| | | |
|---|---|---|
| 2,573,158 | 3/1951 | Pall et al. ............................ 162/146 |
| 3,019,127 | 1/1962 | Czerwonka et al. . |
| 3,228,825 | 1/1966 | Waggoner ............................ 162/156 |
| 3,274,103 | 9/1966 | Adams ............................... 210/505 |
| 3,622,445 | 11/1971 | Heidweiller ......................... 162/145 |
| 4,102,816 | 7/1978 | Stalling et al. ....................... 252/428 |
| 4,207,378 | 7/1980 | Klein .................................... 428/407 |
| 4,239,516 | 12/1980 | Klein .................................... 55/528 |
| 4,293,378 | 10/1981 | Klein .................................... 55/528 |

FOREIGN PATENT DOCUMENTS

| | | |
|---|---|---|
| 1957763 | 5/1971 | Fed. Rep. of Germany . |
| 6801723 | 8/1968 | Netherlands . |
| 868651 | 5/1961 | United Kingdom . |
| 1070737 | 6/1967 | United Kingdom . |
| 1118221 | 6/1968 | United Kingdom . |
| 1364762 | 8/1974 | United Kingdom . |

*Primary Examiner*—Bernard Nozick
*Attorney, Agent, or Firm*—Dann, Dorfman, Herrell and Skillman

[57] ABSTRACT

Undesired substances are removed from a gas or vapor stream containing same by a gas-vapor treating mat composed of glass fibers intermixed with micro-bits of any of an expanded thermoplastic styrene-polymer or expanded thermoplastic lower polyolefin or flexible foam polyurethane and a compatible organic bonding agent, which mat may contain one or more additives from the group of fibers of a fiber-forming terephthalate polyester, activated carbon particles, gas-vapor adsorbent zeolite particles or crystalline molecular sieve particles.

17 Claims, 1 Drawing Figure

METHOD FOR SEPARATING GASES LIQUID DROPLETS AND/OR SOLID PARTICLES FROM GASES OR VAPORS

This application is a continuation-in-part of copending application Ser. No. 18,472, filed Mar. 8, 1979, which, in turn, is a continuation-in-part of application Ser. No. 877,190, filed Feb. 13, 1978, now abandoned.

This invention relates to a method for separating undesired substances, in the form of gases, liquid droplets, or solid particles from a gas or vapor using the adsorption mats which are the subject of my copending application Ser. No. 18,472 now U.S. Pat. No. 4,239,516.

The adsorption mats used in carrying out the invention, which are sometimes referred to hereinbelow as gas-vapor filtering or treating mats consist basically of an intimate mixture of (a) very small (e.g. average 6.3 microns) diameter glass fibers the length of which are at least about 6.3 millimeters and below the length at which the fibers are prone to roping, (b) micro-bits of (i) an expanded thermoplastic styrene-polymer and/or expanded lower polyolefin and/or (ii) a flexible, foamed polyurethane, each of the components (i) and (ii) being non-brittle in expanded form, and (c) a still more minor amount of (i') an organic binding agent which is compatible with the glass fiber and the polymer micro-bits and any other constituent of the mat as well as to the contents of the gaseous and/or vapor stream to which the mat is to be exposed, or (ii') a cobeat (as described further below) of wet lap cotton fibers and micro-bits. The adsorption mat may also include polyester fibers and activated carbon particles. The activated carbon can be replaced as a whole or, under some circumstances, in part by gas-vapor adsorbent, natural and synthetic zeolite particles or molecular sieve particles.

BACKGROUND OF THE INVENTION

A web of merely glass fibers such as the Owens-Corning DE 636 (described in Example 1 below) bound with polyvinyl alcohol (98% hydrolyzed) was made but its use had been rather restricted. For example, it has been used as a battery plate separator and as the base for roof covering to be coated over with tar. However, no such web of glass fiber and polyvinyl alcohol (i.e. called PVA) has been known for use in any such treatment of fluids as described above.

For many years various industries have been concerned with troublesome solid particles of fine droplets of liquids or harmful gases released into working areas and often passing through vents or smoke stacks into the outside atmosphere, thus provoking bothersome environmental problems. In some cases, it has been merely dust particles from working with inorganic materials such as recovering minerals from ores or grinding and polishing operations.

In other cases also involved are liquid droplets entrained from chemical operations such as electroplating, spray coating of one kind or another or production of certain synthetic resins. In still other situations it may be harmful gases, for example, sulfur dioxide carried into the atmosphere as from burning of high sulfur content fuel oils or bituminous coals. Production of a polyphenylene oxide-polystyrene alloy polymer involves release in part of resin fines or pellets, dust particles and of oily plasticizer droplets entrained apparently as an aerosol into the air.

Some attempts to overcome some of these problems have been made by using (i) a filter medium such as a mat of glass fibers held together by a phenol formaldehyde resin binder, or (ii) glass wool air filters in window openings or other outlets. However, generally these filter media are bulky and yet not dense enough to restrain the finer particles or gases, thus still allowing undesirable fluid passage through them and thereby still to pass out to the atmosphere. Then also some of these mats, among other shortcomings, have an undesirably limited tensile strength resulting in too frequent breaks requiring interrupting their use in undue time-consuming repair.

Other attempts include use of electric charging precipitators, such as the long known Cottrell electric precipitators, but these are costly to install, operate and maintain, and do not restrain merely gases, for example, sulfur dioxide.

These disadvantages are overcome by the gas-vapor filter or treating mats of the invention. Then too, these mats of the invention show enhanced porosity and tensile strength over the above described glass fibers and PVA webs used as battery separators and in roof covering sheets.

General Description Of The Invention

Considered broadly, the gas-vapor treating mats of the invention comprise glass fibers (usually composed of a plurality of filaments) varying in diameter from about 0.3 to about 12 microns, generally more readily applicable as of about 6.3 microns, and more often selected as about 6.35 mm. long, and intermixed with micro-bits of any of an expanded, thermoplastic styrene-polymer, an expanded lower polyolefin which is the polymer of an ethylenically unsaturated hydrocarbon monomer having from 2 to 6 carbon atoms, and a flexible foamed polyurethane, each said polymer being non-brittle in expanded form; and with the fiber glass and polymer micro-bits being (a) bonded (primarily at their intersections) by an organic binder which is compatible with the micro-bits, the glass fiber and any other mat constituent as well as the gases (including any entrained liquid droplets or aerosols and fine particles) that are to contact or be treated with the mat, or (b) held together by a cobeat of wet lap cotton fibers and polymer micro-bits (as described below in Example 5). Polyvinyl alcohol at least 98% hydrolyzed and cationic melamine-formaldehyde resin are suitable organic binders, the latter imparting excellent wet strength properties to the mat.

The micro-bits can amount to from about 2 to about 50% of the mat, and beneficially from about 10 to about 35%, and advantageously from about 15 to about 25%. The compatible organic chemical binder may be present at from about 2% to about 10% and beneficially at from about 5% to 8%. The cobeat of cotton fibers and micro-bits may constitute from 5.8% to about 11% of the mat. Glass fibers make up the remainder of the mat. In general, the glass fibers constitute between 93% and 45% by weight of the mat. The tensile strength of the mats varies from about 0.9 to about 5.34 kg. per cm. and the porosity varies from about 152 to 914 liters per sq. dcm. (i.e. square decimeter) per minute at 2.54 cm. ($H_2O$).

The micro-bits component of the gas-vapor treating mats of the invention comprises micro-bits of any of an expanded, thermoplastic styrene-polymer or lower polyolefin, non-brittle in expanded form, or of a flexible foamed polyurethane, likewise non-brittle in expanded form. These micro-bits of an expanded, thermoplastic styrene-polymer or lower polyolefin are more fully described (as in my copending United States of America patent application Ser. No. 833,644 now U.S. Pat. No. 4,207,378 filed Sept. 14, 1977) as an expanded, thermoplastic, non-brittle in expanded form polymer selected from a styrene polymer and a lower polyolefin which is the polymer of an ethylenically unsaturated hydrocarbon monomer having from 2 to 6 carbon atoms, and characterized as being (a) from about 40 to 325 microns long and from about 20 to about 325 microns wide, (b) from substantially completely to entirely completely free of intact cells of the expanded polymer bit-pieces from which they were produced, (c) substantially without any uniformity in outline of the individual micro-bits particles, and (d) in density from about 85 percent of, to about substantially the same as, the specific unexpanded polymer from which there was provided the aforesaid expanded polymer.

These micro-bits of an expanded, thermoplastic styrene-polymer or a lower polyolefin are produced from so-called bit-pieces of any of the expanded thermoplastic, non-brittle in expanded form styrene-polymers or lower polyolefins as starting material. By "bit-pieces" is meant any of the discrete free-flowing forms of any of these styrene-polymers and lower polyolefins, such as (i) the various sizes of granules made by cutting the respective extruded polymer into fairly small lengths usually called pellets or crystal (as with a styrene-polymer) or pellets or cubes of a polyethylene-polystyrene alloy, (ii) the various sizes of styrene-polymer beads obtained from suspension polymerization or otherwise as by molding the particles obtained by disintegrating any of these different polymer forms, (iii) the so-called "grind" including the coarsely ground molded polymer or waste or other scrap such polymer of various sizes, e.g., 3.175 millimeter (i.e. mm.) thick, 6.35 mm. wide, 9.535 mm. long, and (iv) any other small sized shapes of any of them.

The preparation and properties of flexible polyurethane foams are described, for example, in the "Handbook of Foamed Plastics", Bender, Rene J., Section X, pp. 173-236, Lake Publishing Corporation, Libertyville, Ill., U.S.A. (1955), "Polyurethanes: Chemistry and Technology", Saunders & Frisch, Chapter VII, Part II, Interscience Publishers, New York, N.Y., U.S.A. (1964), and "The Development and Use of Polyurethane Foams", Doyle, E. N., pp. 233-256, McGraw Hill Book Company, New York, N.Y., U.S.A. (1971).

The flexible polyurethane foams useful to provide foamed polyurethane micro-bits preferably should be no greater than 95.3 gm. (i.e. grams) per liter in density, beneficially ranging from about 47.7 to about 15.9 gm. per liter, and show excellent recovery after 75% deflection with approximately less than 1% loss in height (as determined by American Society of Testing Materials D-1564-64T).

The flexible foam polyurethanes are not obtained in the foregoing same bit-pieces forms as are the styrene-polymers and lower polyolefins, but rather in continuous foamed blocks as a result of the reaction that provides the polyurethane. Accordingly, the foamed polyurethane blocks first are shredded into bit-pieces (for example, similar to how they may be prepared for use in stuffing into various articles).

The foamed polyurethane micro-bits are more fully described (as in my copending United States of America patent application Ser. No. 833,643 filed Sept. 15, 1977) as comprising broken and interconnected strand portions from adjacent cells of the flexible foam, which strand portions show substantially total absence of intact cells and cell windows and are tripodal particles with generally uneven length legs, the strand portions having hook-like projections, indentations and flutes resulting from destruction of the cells and cell windows of the starting flexible foam.

The micro-bits of any expanded thermoplastic, non-brittle in expanded form styrene-polymer or expanded lower polyolefin or flexible foamed polyurethane are prepared by disintegrating the respective starting expanded polymer bit-pieces in a comminuting machine such as that produced by Fitzpatrick Company (of 832 Industrial Drive, Elmhurst, Ill. 60120, U.S.A.) according to their Bulletin No. 152 copyright 1968 using the broached fixed blades (identified therein by "Code DS225") to replace the blades or other comminuting elements, mounted for rotation in the comminuting chamber mode DASO6, both shown on that bulletin's page 5. That chamber is liquid-tightly capped, for example, by a cover such as shown in their Code M44D6 or Code MA44D6 (upper half of page 3 of their Bulletin 152).

That model DASO6 comminuting chamber is rectangular in horizontal cross-section and has a pair of opposed parallel entirely vertical walls integrally joined at each of their opposite ends by a separate one of a pair of opposed vertically arcuate walls each with its convex face exposed to the exterior.

Sixteen indentical, salt-shaped comminuting arms are separately removably but fixedly carried with their snugly adjacent to one another bases encircled about, and keyed to, the operating shaft and intermediate its free outer mounting ends. These arms extend radially out from the shaft (e.g. 127 mm. from its axis to the outer end of each arm) with the first of each consecutive four of them extending horizontally toward one arcuate wall, the second of each four extending vertically, the third four of them extending toward the other arcuate wall, and the fourth four of them extending vertically downward.

Each arm is rectangular in cross-section in a plane running through the entire length of the shaft's axis and of that arm, and of each arm 180° removed from it. The outer end of each arm meets at right angles with its two wider sides (5.4 mm. width) and its narrow or impact side (9.525 mm. wide) facing the direction of rotation. That narrow side also meets at right angles with the two wider sides which are parallel to one another for most of their width and with the trailing third of their surfaces tapering to one another and terminating in the knife edge of their trailing end.

Each free exposed end of the shaft extends through its respective stuffing box in its neighboring one of the two parallel vertical walls on through a bearing carried on a respective trunnion affixed to the machine's foundation and spaced outwardly away from the respective wall. A driving pulley is mounted on each end of the shaft extending outwardly from its respective mounting trunnion.

The bottom of the comminuting chamber is an exchangeable dish-shaped, arcuate screen curved convexly downward with an inside radius (from the axis of the operating shaft) equal to the length of a comminuting arm plus 0.762 mm. clearance. The screen's overall rectangular peripheral opening has such dimensions and shape as to enable it to be removably fitted in a liquid-tight engagement with the bottom of the four walls of the comminuting chamber.

The screen has staggered rows of, for example, circular holes varying in diameter as from 0.102 to about 3.175 mm. and closely spaced to one another with sufficient space between them for the screen to hold up under working conditions.

Except for its starting material feed hopper inlet at one side of it, the rest of the chamber's cover is arcuate and convex upwardly with a radius (from the axis of the operating shaft) sufficient for the rotating arms to have a 0.762 mm. clearance from the inwardly facing surfaces of a plurality (e.g. three) pre-breaker bars (about 20.32 cm. long and 6.35 mm. wide) protruding for 3.175 mm. along their entire length into the interior of the comminuting chamber, and extending spaced apart from one another and parallel to the axis of the operating shaft.

The selected driving pulley on the operating shaft is connected by driving belts extending from a motor shaft drive pulley and can be operated at speeds embracing the range of from about 4700 to about 8000 r.p.m., and more effectively from about 5000 to about 7500 r.p.m.

The invention includes also a form of these mats, which can be called the gas-vapor adsorption filtering or treating mats. These include the basic or primary constituents (a) the glass fibers, (b) the micro-bits, and (c) the organic binding agent, each being generally within its earlier above recited respective range relative to the others of them, together with an amount of any of (i) finely divided activated carbon (as primary gas-adsorbing agent) and (ii) finely divided zeolite particles, or (iii) finely divided molecular sieve particles (such as described further below) and under that at which undesirable dusting off of carbon, or zeolite, or molecular sieve particles can occur, also a sufficient amount of the cobeat to serve to restrain the carbon or molecular sieve particles against dusting off, and an amount of a fiber-forming terephthalate polyester sufficient to hold the mat's tensile strength within its earlier above recited range without undesirable lowering of the mat's porosity.

Thus, for example, in addition to its three primary constituents (a), (b), and (c), these adsorption filtering and treating mats can contain, of their overall content, the activated carbon to a maximum of about 50%, the zeolite particles or molecular sieve particles to the extend of about 75%, the polyester fibers in the range from about 2% to about 7.5%, and from about 2% to about 30% of cobeat.

Any of the gas-adsorbing activated carbons from their various sources, for example, charcoal, coal, petroleum distillation residue or pecan nut shells, can be used.

The zeolites suitable for use in the adsorption mats of this invention are natural hydrated aluminum silicates of the formula $Na_2O \cdot Al_2O_3 \cdot nSiO_2 \cdot xH_2O$, or synthetic ion exchange resins, having gas adsorbent capabilities.

The herein applicable molecular sieve particles are the gas-vapor adsorbent, crystalline, natural or synthetic molecular sieve particles of the type more specifically described further below.

There will now be described a method of preparing the mats of this invention. Broadly the preparation of the gas-vapor treating mats comprises dispersing in water in a pulper (as used in paper making) an amount of (a) micro-bits of any of an expanded, thermoplastic styrenepolymer, and expanded lower polyolefin from polyethylene to polymethylpentene and a flexible polyurethane, each said polymer being nonbrittle in its expanded form, and (b) glass fibers composed of the glass filaments, as described above, and agitating the mixture of (a) and (b) for the brief time at least sufficient for each of them to be substantially free of clumps and clusters and substantially uniformly intermixed, and in the proportion of from about 5 to about 50 parts of the micro-bits to from about 93 to about 45 parts of the glass fibers, (c) admixing an organic binding agent (as described earlier above) or a cobeat (as described further below) in an amount sufficient for the finished mat to have tensile strength and porosity with each of them being within its respective earlier above recited range; then transferring the resulting mixture in a concentration of from about 0.1% to 0.5% of the admixed micro-bits and glass fibers to a supply chest and therein agitating their mixture merely sufficiently to maintain a uniform dispersion.

The dispersion then is fed from the supply chest to the furnish box (of the Fourdrenier machine) at the rate, for example, from about 3.3 to 5.5 kg. (i.e. kilogram) per minute and at the same time is diluted uniformly with water fed into the furnish box at the rate of from 3,800 to about 9,000 liters per minute.

The resulting diluted furnish slurry then is fed onto the Fourdrenier screen moving at a rate to provide a wet mat which after drying has a basis weight of from about 2.25 to about 22.5 kg.; and continuously removing the wet mat from the screen and running it through a suitable drying operation.

The gas-vapor treating mat can be prepared by including adding to the mixture in the pulper, beneficially before admixing any binding agent a separate amount of each of sodium hexametaphosphate and concentrated sulfuric acid and in such proportion to one another sufficient to lower the pH of the mixture to 2.5.

The gas-vapor adsorption treating mats are prepared by a combination of steps comprising preparing a cobeat suspension of wet lap cotton fibers and micro-bits in water (as described further below) and separately producing a suspension of micro-bits in water in the proportion recited further below.

Then a furnish supply suspension is prepared by admixing in water an amount of the cobeat suspension within a given range and adding a quantity of a fiber-forming polyethylene terephthalate polyester in a quantity to partake in providing the finished mat with tensile strength within an effective range without adversely affecting its porosity. Then any of the finely divided activated carbon or zeolite or molecular sieve particles are admixed within the range up to a maximum of about 50% (for the carbon alone), and 75% (for the zeolite or molecular sieve particles alone) of the planned total solids of the finished mat, and an aqueous suspension of the micro-bits is added in an amount to provide in the finished mat from about 5% to about 30% of micro-bits.

The resulting admixture is a suspension of glass fibers, micro-bits and binding agent, each within its respective range as earlier recited for the gas-vapor treating mat and so proportioned to the other solids for the finished mat to have the planned tensile strength and porosity. The finally resulting suspension from all of these included constituents is fed to the furnish box within the rate of feed recited for the mats lacking the carbon and polyester, and there similarly diluted with water and then fed onto the Fourdrenier screen and dried as with the other mats.

In preparing a mat wherein a polyvinyl alcohol is used as the binding agent, it may be desirable to add that agent to the suspension (being prepared) within the last minute or so of the agitation before the suspension is to be fed to the (machine) supply chest and also that the web leaving the Fourdrenier screen initially is subjected to radiant heat from a relatively close source at a temperature in the range of from about 600° C. to about 700° C. That rapidly causes solution of the binding agent in the water carried by the mat and enhances the drying of the binding agent at the intersections of the water insoluble constituents.

The preparation of any of the desired styrene-polymer, lower polyolefin or polyurethane micro-bits from starting bit-pieces of any of the respective expanded polymers (styrene-polymer, lower polyolefin or polyurethane) is illustrated in, but not restricted to, the following preparation of polystyrene micro-bits:

Example A—Micro-Bits From Expanded Extruded Polystyrene Pellets: 425 liters of expanding-agent-impregnated, extruded polystyrene pellets (crystal) expanded to from about 6.35 to about 12.7 mm. substantially round pellets having a bulk density of 12 grams per liter were comminuted in a comminuting machine (as described earlier above) equipped with an input feeder 10.16 cm. in diameter by 7.62 cm. long and a bottom arcuate screen with holes of 0.1016 mm. diameter.

The rotor was set to run at 6,000 r.p.m. and the feeder set to charge the expanded polystyrene bit-pieces at the rate of 35.4 liters every 5 minutes (i.e. 425 liters per hour). The starting expanded polystyrene bit-pieces to be introduced into the feeder were wetted with sufficient water substantially completely to cover their outer surfaces. The thus wetted expanded polystyrene bit-pieces were charged into the feeder continuously at a rate of 35.4 liters every 5 minutes, while at the same time water was injected into the comminuting chamber through the two 1.6 mm. diameter jet orifices at a rate of 7.57 liters per minutes.

The mixture of the expanded polystyrene micro-bits in water leaving the screen bottom of the comminuting chamber was collected in an open tank with a bottom drain plug, wherein the free water settled to the bottom and the polystyrene micro-bits with the bound water held by them (in the proportion of 2 parts of micro-bits to 98 parts of water), due to the entrapped air, rose on top of the free water. The free water was drained off leaving behind a plastic mass of the resulting expanded polystyrene micro-bits in the water physically bound to them. The plastic mass weighed 255.15 kilos and contained 5.1 kilos of micro-bits with 250.05 kilos of water bound by them.

27.24 kilos of this plastic mass, placed in a close weave double cotton bag, then were subjected to pressure until 22.71 liters of water were expressed. The remaining 4.08 kilos containing 544 grams of expanded polystyrene micro-bits then were dried in an open dish in an oven maintained at 43.33° C.

Micro-bits of any other thermoplastic expanded styrene-polymer or lower polyolefin, each non-brittle in expanded form, or of any flexible foamed (i.e. expanded) polyurethane non-brittle in its foam or expanded form can be prepared by repeating Example A and replacing its starting polystyrene bit-pieces by bit-pieces of any of these other applicable expanded polymers. Thus, each such repeat of Example A starting with the micro-bits of each such other applicable expanded polymer is to be considered as if incorporated herein in full as a separate example, thereby avoiding unnecessarily extending this specification.

The preparation of the gas-vapor treating mats of the invention is illustrated by, but not limited to, the following examples:

EXAMPLE 1—BASIC GAS-VAPOR TREATMENT MAT

Into 15,139 liters of water charged into a (paper making) pulper (of very little greater capacity), there was fed by an endless belt conveyor 23.27 kilos (dry basis) of polystyrene micro-bits (in the form of water-bound product containing 8% micro-bits solids). The pulper contents mixture then was agitated for 3 minutes by its rotor turning at 506 revolutions per minute (r.p.m.) thereby dispersing the micro-bits in the water.

While agitating the mixture, 22.73 kilos of sodium hexametaphosphate were admixed and followed by admixing 3.785 liters of concentrated sulfuric acid (98.6% $H_2SO_4$). That brought the pH of the batch to 2.5.

The agitation was stopped while there were added (from a number of cartons) a total of 113.64 kilos of 6.35 millimeters (length) glass fibers (diameter 6.3 microns) Owens-Corning electrical grade DE 636 as the number of filaments per bundle (and bound by a starch, oil and cationic surfactant binder).

The rotor agitation was resumed and continued for 10 minutes, during the last 30 seconds of which 10.25 kilos of (cold) water-swellable polyvinyl alcohol (98% hydrolyzed) (hereinafter called PVA) fibers were added as binding agent. The thus completed initial pulper mix was pumped to the beater chest (serving only as holding facility to receive amounts of pulper mix) and agitated there merely sufficiently to maintain the insolubles in suspension.

7570 liters of (rinse) water then were added to the pulper and agitated to suspend any glass fibers and/or micro-bits which settled out and remained behind while the initial pulper mix was being pumped to the beater chest. The resulting so-called pulper rinse mix then was pumped to the beater chest and there admixed into the initial pulper mix to provide the starting mat-making mix containing 0.64% solids.

This starting mat-making mix then was pumped to the machine chest (also a supply holding chest) with its contents maintained under agitation also as in the beater chest. From this supply chest the mat-making mix was fed to the furnish box for the Fourdrenier at a rate of 4.32 kg. solids per minute and there combined with clear dilution water at a rate of 6056 LPM.

The resulting uniform web-furnish slurry (as diluted in the furnish box) was fed onto the traveling Fourdrenier screen (86 strands in the machine direction and 60 strands across) moving at a rate of 15.24 meters per minute (i.e. MPM) to enable providing an initial web mat which after later finished drying showed a basis weight of 19.1 kg.

The 9.525 mm. thick wet mat (on the Fourdrenier) after passing the suction boxes under the leaving end of the Fourdrenier screen continued onto an endless belt conveyor (a 112 by 84 mesh screen) also at 15.24 MPM. Then after about 1.5 meters beyond that end of the Fourdrenier, the wet mat (on that conveyor) passed about 10 cm. below a battery (about 60.5 cm. long) of infrared lamps (52.4 kilowatts, at 3.8 amperes, 480 volts, single phase 60 cycle) providing at the mat surface a rheostat set temperature of possibly 649° C. The exposure of the wet mat to that temperature thus for about 2.4 seconds quickly caused solution of the PVA.

The partially dry web continued through a tunnel dryer (about 3.67 meters long by 1.83 meters wide) providing a temperature of about 121° C. and then alternated in sequence over one and then under the next of each of a series of six dryer drums (the first drum providing a temperature of 113° C. with the temperature increased at each of them that followed with the last drum maintained at 127° C. The finally dry mat then passed through a pair of tension rollers and onto a wind up drum. That dry mat web with a smooth surface on each side wound up easily around that drum without any tears or wrinkles.

At its basis of 19.1 kilos, the finished gas-vapor treating web showed a porosity value (by Gurley porosity meter) of about 602.8 liters per minute (i.e. LPM) per square decimeter (i.e. sq. dcm.) of surface at a test differential air pressure of 2.54 centimeters of water (gage).

Based on the starting amounts of the essential materials, the finished dry gas-vapor treating mat contains about 15.8% of the expanded polystyrene micro-bits, about 77.2% of glass fibers and about 6.97% of polyvinyl alcohol binder. The content of these essential constituents may be varied in accordance with desired variations in porosity, gas or vapor fluid flow rate and density by suitable variations in the constituents content. For example, the porosity can be decreased by lowering the micro-bits content to any level down to a minimum of about 2% without corresponding decrease in tensile strength.

Alternatively, the porosity and flow rate can be increased by increasing the micro-bits content, as in some formulations, to any level even up to about 50%, of the total solids.

Example 1 can be repeated by reducing the quantity of sulfuric acid in part or as a whole and also by reducing the amount of sodium hexametaphosphate (ordinarily used to enhance glass fibers dispersion) in whole or in part in preparing the initial pulper suspension, in view of the indication that the micro-bits appear to enhance dispersion of the solid constituents during agitation in the water.

Depending on the anticipated ultimate use of the gas-vapor treating mat its basis weight can be reduced or enlarged by either decreasing or increasing the solids content in the aqueous furnish in the furnish box or increasing or reducing the speed of the Fourdrenier screen.

EXAMPLE 2—BASIC GAS-VAPOR TREATING MAT WITH POLYURETHANE MICRO-BITS

Into a 3.5 liter stainless steel beaker containing 3 liters of water, there was dispersed 21.5 grams of (furniture grade) flexible polyurethane micro-bits containing 20% solids (thus 4.3 grams of micro-bits dry basis and 17.5 cc. of water) by an air driven stirrer. Then 15 grams of the same 0.635 cm. length DE 636 glass fiber (as of Example 1) were added and agitation continued. In the last 10 minutes of an hour of stirring there was admixed 1.375 grams of the PVA (same as in Example 1).

Six-tenths of the resulting dispersed slurry then was poured over the hand sheet screen of an ordinary laboratory paper hand sheet former (having a 30.48 cm. high brass tank with a 20.32 cm. square base) and mixed from the top. The water discharge valve was opened with the solids of the slurry developing in sheet form on the screen and the water dripping through the screen by gravity from the increasing density slurry. After no further water drained off by gravity, the wet sheet was dried in a drying oven by a hot air stream of 121° C. flowing through it for 5 minutes. The resulting 12.57 grams dry hand sheet mat showed a tensile strength of 1.41 kilos per cm. and porosity of 579 liters per minute per square decimeter at a pressure differential of 2.54 cm. ($H_2O$).

Example 2 includes no sodium hexametaphosphate and sulfuric acid because the micro-bits tend to enhance dispersion of the glass fibers which as introduced into the water appear to a large extent in a multitude of bundles of the fibers. Other mats of this invention can be made similarly without these two inorganic substances, from micro-bits of the other effective polymers.

EXAMPLE 3—EXAMPLE 2 MAT WITH COBEAT BINDER INSTEAD OF PVA

Example 2 was repeated except that during the agitation after admixing the glass fibers, instead of PVA there was admixed 60 grams of the cobeat suspension of Example 5 amounting to 1.2 grams of the cobeat solids (composed of beater beaten, interlocked wet lap cotton fibers and polystyrene micro-bits). The preparation of the mat then was completed as in Example 2. The resulting dry mat showed porosity of 335 liters per minute per sq. dcm., at 2.54 cm. ($H_2O$) differential pressure (gage), and tensile strength of 0.61 kg. per cm.

EXAMPLE 4—EXAMPLE 3 WITH POLYSTYRENE REPLACING POLYURETHANE

Example 3 was repeated by using polystyrene microbits instead of the polyurethane micro-bits, and also cobeat as the binder instead of PVA. The resulting dry web showed tensile strength of 0.22 kg. per cm. and porosity of 305 LPM per square decimeter at differential pressure of 2.54 cm. ($H_2O$).

The adsorbent (constituent) containing gas-vapor filtering or treating mats of this invention are illustrated by, but not restricted to, the following:

EXAMPLE 5—ACTIVATED CARBON-CONTAINING ADSORPTION MAT (a) Cobeat Suspension Preparation: A cobeat suspension (so-called because wet lap cotton fibers and microbits are beaten together in a beater) was prepared by charging 363.6 kilos (dry basis) of wet lap cotton fibers (as used in paper making, containing 1454.4 liters of water in the fibers) and 181.8 kilos (dry basis) of polystyrene micro-bits (6% solids with 2848.5 liters of bound water) into 13,354 liters of water in a pulper and agitated for 3 minutes (as in Example 1) thereby dispersing the cotton fibers and micro-bits free of clumps and clusters in the water.

That cotton fibers and micro-bits dispersion was pumped to a (paper making) beater having its pressure roll set at 65% of maximum and run at 110 r.p.m. for 6 hours (when the freeness starting at 760 was found to have dropped to 600). The roll setting then was changed to provide more fibrillation and less cutting action, by using only the brush roll pressure with the roll barely contacting the bed. The desired end occurred in two hours when the freeness was found reduced to 450. The beater content (now the cobeat suspension) was retained in the beater under merely sufficient agitation for the dispersion to remain in suspension for later use.

The wet lap cotton fibers are those commonly used in writing paper making to provide its cotton rag content. They are prepared for the most part from cottom fabric cuttings and cotton linters which are washed (bleached if necessary) and separated into fibers (as in a hollander) of from about 4.23 mm. to about 1.27 cm. in length, fed to a wet lap machine and from it as a web between pressure rolls and leaving as a web about 2.1 mm. thick (containing about 80% moisture) and then lapped up and back over and over on a pallet usually to a pile of about 363.8 kilos gross weight.

(b) Micro-bits Suspension: Into 7570 liters of water in the pulper, there was admixed 136.4 kilos (dry basis) of the polystyrene micro-bits (as the water-bound product containing 16% micro-bits solids and 715.9 liters of water) and agitated to a uniform dispersion and maintained under merely sufficient agitation for that until shortly needed.

(c) Furnish Supply Suspension: A furnish supply suspension was prepared in a beater chest
(i) by feeding into it 30,280 liters of water,
(ii) admixing into the water 189.3 liters of the foregoing cobeat suspension, thus providing a diluted cobeat suspension,
(iii) followed by admixing 91 kilos of readily water dispersible, semi-dull, optically whitened polyethylene terephthalate polyester (beneficially in 1.27 cm. long fibers of 1.5 denier) spun by conventional melt process, having a special finish compatible with most anionic, cationic or nonionic binders (and providing rapid and excellent dispersion with a wide variety of furnish systems and additives), and solution viscosity of 770±20 of ½ gram dissolved in 50 ml. of solvent (by weight, 40 parts of tetrachloroethane and 60 parts phenol) at 25° C. (solution viscosity is the viscosity of the polymer solution divided by the viscosity of the solvent, with the result minus one multiplied by 1000); melting point 48.67° C., non-shrinkable in boiling water, and elongation at break 45% (available as TREVIRA 101, product of American Hoechst Corporation, Fibers Division, Spartenburg, S.C. 29301) the incorporation of polyethylene terephthalate fibers in the suspension requires a relatively low solids content.
(iv) admixing 172.7 kilos of finely divided activated carbon (Nuchar S-N, product of Westvaco Corporation, Covington, Va. 24426); and also
(v) admixing the foregoing micro-bits suspension containing the 136.4 kilos (dry basis) of polystyrene micro-bits as the water-bound product (having about 16% micro-bits solids) thereby adding 716 liters of water to the 7570 liters initially included; and finally
(vi) adding 4163.5 liters of the cobeat suspension (containing 193.4 kilos of solids) and 15,140 liters of the just below identified glass fibers, micro-bits and binder suspension containing 187.7 kilos of suspended solids.

(d) Glass Fibers, Micro-Bits And Binder Suspension: This suspension was prepared by the procedure used in (the first 4 paragraphs of) Example 1 by charging into a pulper 11,354 liters of water, admixing 22.73 kilos (dry basis) of polystyrene micro-bits as the water-bound product (containing 6% solids and 356 liters of water), dissolving 22.73 kilos of sodium hexametaphosphate and 3.8 liters of sulfuric acid (98.6%), and admixing 113.64 kilos of the same 6.35 mm. length glass fibers and 10.23 kilos of the same PVA fibers. This suspension then was pumped to a beater chest.

The pulper then was rinsed by adding 3785 liters of water and agitating the content as in Example 1. The resulting rinse suspension then was admixed with the pulper suspension in the beater chest, thus providing the glass fibers, micro-bits and binder suspension, as the second member of the constituent (vi) of the furnish supply suspension.

While maintained under agitation in the beater supply chest, this uniformly admixed furnish supply suspension was fed to the Fourdrenier machine head box at the same rate and admixture with dilution water as in Example 1, and onto the moving Fourdrenier screen. After passing the suction boxes, the resulting wet web continued onto the endless belt conveyor and then was dried by passing in sequence under the battery of infrared lamps through the tunnel dryer and under and over the series of six dryer drums.

The final activated carbon-containing adsorbing mat was uniform in appearance with a basis weight of 15 to 15.45 kg., porosity of 353.7 liters per minute per square decimeter at a pressure differential of 2.54 cm. ($H_2O$), and tensile strength of 1.074 kilos per cm. in the machine direction and 0.895 kilos per cm. in the cross direction.

EXAMPLE 6—Molecular Sieve-Containing Adsorption Mat

Example 5 was repeated but with its 172.7 kilos of activated carbon replaced by the same amount of the gas-vapor adsorbent molecular sieve powder particles having nominal pore diameter of 5 Angstroms and the chemical formula $Ca_{4.5}Na_3[(AlO_2)_{12}(SiO_2)_{12}]$. The resulting mat showed tensile strength much like that of the mat of Example 5 and porosity of about 410 liters per minute per square decimeter at 2.54 cm. ($H_2O$).

The polystyrene micro-bits of Examples 1, 4, 5 and 6 can be replaced in part or as a whole by micro-bits of any other of the applicable expanded thermoplastic styrene-polymers or of expanded lower polyolefins or of flexible polyurethanes, each of them non-brittle in expanded form. Thus, each such repeat of Examples 1, 4, 5 and 6 by the just indicated replacement of expanded polystyrene micro-bits is to be considered as if occurring herein in full as a complete example, thereby avoiding making this specification prolix. The lower polyolefins from polyethylene to poly-methylpentene include also polypropylene and polybutene.

In any of Examples 1 to 5, and any of the just above indicated modifications of any of them, the micro-bits can be provided with any amount of water held by them as well as in the dry state. The micro-bits were provided in these examples as used along with different amounts of water held by them, because of their ready availability in that form and their thus lower cost.

Similarly, the cotton fibers used in preparing the cobeat were provided in their form as wet lap cotton fibers, ordinarily containing about 80% of water, because of the economy in doing so. However, that does not preclude using these cotton fibers in the dry state when thus available or desired for any particular reason.

The Westvaco's NUCHAR S-N activated carbon in Example 5 can be replaced by any other Westvaco activated carbon. For example, if the mat is to be used for absorbing phenol, Westvaco's NUCHAR N-A (yielding an acid wash water when washed in water)

would be beneficial because that acid grade manifests higher adsorption of phenol.

Either of these two grades of activated carbon can be replaced by any of the others available, for example, DARCO now available from I.C.I. (U.S.A.) Ltd., and the NORIT product of American Norit Co. The Barneby-Cheney activated carbon from pecan nut shells is highly effective, for example, in the adsorption of sulfur dioxide from a gas stream, for which it showed a very much greater adsorption capacity than an activated carbon from another source. Thus, Example 5 is to be considered as if presented written out in full with its activated carbon replaced by the Barneby-Cheney product, or any other available suitable finely divided activated carbon.

The polyester of Examples 5 and 6 can be replaced by any other fiber-forming terephthalate polyester, for example, the FORTREL polyethylene terephthalate or by the KODEL dimethyl 1,4-cyclohexane dimethanol terephthalate. The molecular sieve particles of Example 6 (product of Union Carbide Corporation, 270 Park Avenue, New York, N.Y.) may be replaced as a whole, or in part, by any other such molecular sieve particles, e.g. having nominal pore diameter of from 4 to about 10 Angstroms.

Another molecular sieve material which is particularly useful for incorporation into the gas-vapor treating mats of the present invention is a hydrophobic, organophilic, cyrstalline silica molecular sieve known as silicalite (also a product of Union Carbide). The synthesis, crystal structure and properties of silicalite are described by Flanigen et al in *Nature,* Vol. 271, pp. 512–16 (1978). Briefly, silicalite is a new polymorph of $SiO_2$ (mean refractive index 1.39, density 1.76 g/cm.$^3$) having a novel topologic type of tetrahedral framework which contains a large fraction of 5-membered rings of silicon-oxygen tetrahedra, and encloses a 3-dimensional system of intersecting channels, defined by 10-rings of oxygen ions in all three directions. Organic quaternary ammonium ions which occupy the channels in the precursor obtained by hydrothermal synthesis, are removed by heating to yield silicalite. The resulting void occupies about 33% of the crystal volume, and the three-dimensional channel is wide enough to absorb molecules up to about 6 angstroms in diameter.

The silicalite precursor is crystallized hydrothermally in a closed system containing alkylammonium cations (for example, tetrapropylammonium), hydroxyl ions, and a reactive form of silica at 100°–200° C. The organic-containing precursor crystals have a typical composition $(TPA)_2O.48SiO_2.H_2O$ (mean refractive index 1.48, and measured density 1.99 g/cm.$^3$ The organic cation is larger than the pore and therefore must be removed by chemical or thermal decomposition (usually calcination in air at 500°–600° C.) to yield the microporous silicalite crystals. As the silica framework is electrically neutral, the organic ion is apparently occluded with hydroxyl ions to maintain charge balance, as indicated by infrared spectroscopy. The unit cell composition for the precursor crystals can be expressed as $[4TPAOH.96SiO_2]$. Unlike aluminium-containing zeolites, silicalite has no cation exchange properties.

Silicalite has an adsorption pore size near 6 angstroms and a saturation adsorption pore volume of 0.19 cm.$^3$/g. At ambient temperature, it adsorbs molecules as large as benzene (kinetic diameter 5.85 angstroms) but rejects molecules larger than 6 angstroms, such as neopentane (kinetic diameter 6.2 angstroms). Although the pore-size effect can be used in molecular sieving, its most remarkable adsorption property is surface selectivity. In contrast to the extremely high preference of aluminosilicate zeolite surfaces for water (hydrophilic) and other polar molecules, silicalite has a very low selectivity for the adsorption of water and a very high preference for the adsorption of organic molecules smaller than its limiting pore size. The hydrophobic and organophilic characteristics of this material make it useful for the separation of lower alcohols, phenol, pentane and hexane from a fluid stream containing same, even in the presence of water.

Adsorption of organic molecules and permanent gases on silicalite occurs by the volume filling of micropores as in zeolite molecular sieves and other microporous adsorbents. The filling of micropores occurs by physical adsorption at low relative pressures, and is characterized by enhancement of the adsorption energy due to increase of dispersion forces resulting from comparable size of the adsorption volume and the adsorption molecule.

Examples 5 and 6 are to be considered as if written out in full herein with the polyester or molecular sieve particles separately respectively replaced by each one of the aforementioned alternative polyesters or molecular sieve particles. Any of the polyesters can be used in any of the available 1.5 and 3 denier diameters.

The principal utility of the adsorption mats described hereinabove is in the separation or removal of undesired substances from a gas or vapor containing same. These mats are extremely effective in removing a variety of contaminants in the form of gases, liquid droplets or solid particles from gas or vapor streams, and may be employed as the filter medium in the filtration method described in U.S. Pat. No. 3,745,748 to Goldfield et al, the complete disclosure of which is hereby incorporated by reference herein. For example, substances such as $SO_2$, benzene, carbon tetrachloride and phenol have been readily removed from a stream of nitrogen using adsorption mats of the present invention. In most instances, very sharp breakthrough points were observed in tests conducted on these substances. Particularly good results are obtained when using an activated carbon-containing adsorption mat such as that described in Example 5 above because of its considerable surface area.

Notwithstanding that the approximate thickness of the finished adsorption mats is a mere 0.03 inches and that the residence time of the gas or vapor in the mats is thus quite short, mass transfer of the contaminants from the gas or vapor to the mats occurs to a significant degree. It is believed that the passage of a contaminated gas through the adsorption mats at a velocity on the order of 15 to 25 ft./min. causes sufficient turbulence within the mat to increase the diffusion of the gas therein and simultaneously reduce the film coefficient thereof, thereby permitting almost instantaneous mass transfer.

The sole FIGURE of the drawing is a schematic representation of the apparatus used in testing the effectiveness of the gas-vapor adsorption mats of this invention in separating an undesired gaseous or vaporous component from a gas stream.

Figure 1:
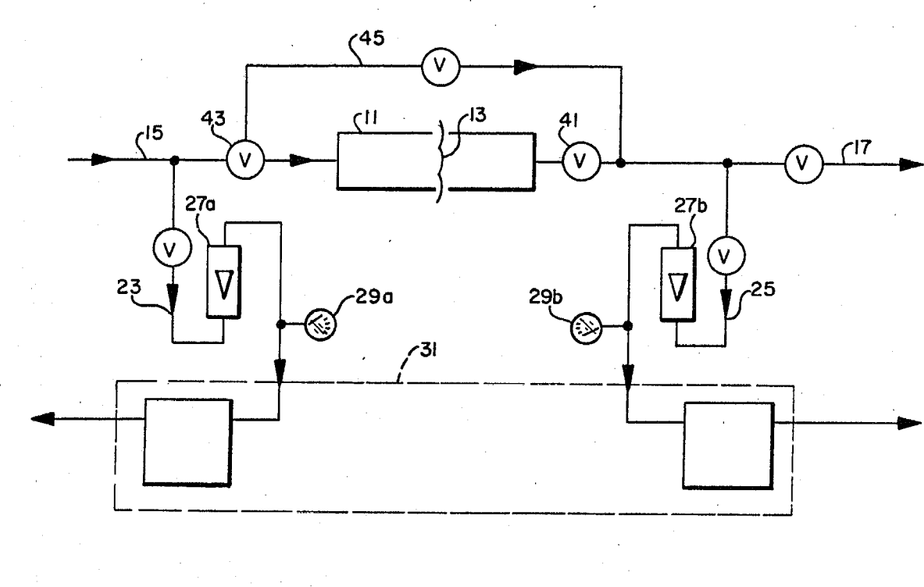

The apparatus shown in the drawing includes a cylindrical adsorption chamber 11 containing a gas-vapor adsorption mat 13 of the present invention mounted therein perpendicular to the axis of the cylinder, with the porous medium filling the entire cross-sectional area of the chamber. A carrier gas in which is entrained the undesired substance (sometimes referred to hereinbelow as the adsorbate) is introduced under pressure into chamber 11 through feed line 15, passes through adsorption mat 13, and exits chamber 11 through vent line 17. Feed line 15 and vent line 17 are connected via lines 23 and 25, respectively, to a measurement device 31 capable of accurately measuring the concentration of the undesired substance in the feed stream and in the vent stream, and providing readings of the differences between the two concentrations. Suitable measurements devices for this purpose are well known to those skilled in the art. Such devices are generally provied with means for continuously recording the readings e.g., a strip-chart recorder (not shown). Lines 23 and 25 are each provided with a rotameter 27a, 27b, which measure the flow of gas passing therethrough, and a pressure guage 29a, 29b.

In order to insure against an incorrect reading by measurement device 31, the system should be regularly purged with a clean inert gas, viz., after each half cycle of a test run, i.e., after each adsorption and desorption. In order to purge the system, adsorption chamber 11 is isolated from the remainder of the system by shutting valve 41, adjusting three-way valve 43 to direct the flow of gas in feed line 15 through bypass 45, rather than through chamber 11. Thereafter, the clean inert gas is passed through feed line 15. By operating in this manner, the possibility of measuring a residual contaminant from a previous test run or the other half cycle of the same run is minimized.

Although the drawing illustrates the adsorption mat mounted in chamber 11 in a planar fashion, the mat may be tightly wrapped around a solid support core, and mounted in the adsorption chamber like a plug, with the porous medium and the core filling the cross-sectional area of the chamber, and the gas flow path being parallel to the support core.

The following examples will further serve to illustrate the method of use aspect of this invention. The tests reported in the examples were carried out using the test apparatus described hereinabove. The adsorption chamber had a cross-sectional area of 0.0218 square feet.

The expression "breakthrough" as used hereinbelow signifies the time it takes before the first trace of absorbate appears in the vent stream from the adsorption chamber. Breakthrough ordinarily results from a localized break or channel formed in the porous medium, which permits the gas stream to pass through without being filtered. The occurrence of breakthrough is clearly indicated by a sudden increase in the adsorbate concentration of the vent stream. The expression "saturation time" signifies the time at which the vent stream adsorbate concentration equals that of the feed stream.

The values given for breakthrough capacity in the examples are calculated according to the following equation: $q_B = (F_i)(t_B - t_R)$, wherein $q_B$ is the amount of adsorbate adsorbed at breakthrough (in grams); $F_i$ is the adsorbate feed rate (in grams/min.); $t_b$ is the breakthrough time (in min.); and $t_R$ is the residence time of the test quantity of the contaminated feed stream in the system, without the mat (in min.). This equation is based on the assumption that until breakthrough, all the adsorbate in the feed stream is adsorbed.

The values given for saturation capacity in the examples are calculated according to the following equation: $q_{SAT} = (F_i)(t_{\frac{1}{2}} - t_R)$, wherein $q_{SAT}$ is the approximate saturation capacity at the feed concentration used (in grams); $t_{\frac{1}{2}}$ is the time at which the breakthrough curve reaches 50% of total deflection; and $F_i$ and $t_R$ are as defined above. This equation is based on the assumption of an equivalent front that would result in total adsorption at 50% of feed value.

The $SO_2$-containing feed gas referred to in the examples was prepared by metering a pre-determined amount of $SO_2$ into a stream of nitrogen gas. The feed gas containing organic substances was prepared by passing a stream of nitrogen gas into a closed reservoir containing the organic substances through a first line submerged in the liquid, and withdrawing a measured amount of gas or vapor from the space above the liquid through a second line which is metered into a stream of nitrogen gas.

Each adsorption was followed by a desorption (adsorption + desorption = 1 cycle) which was carried out by passing the carrier gas, free of any adsorbate, through the mat at approximately the same velocity used for adsorption.

EXAMPLE 7

$SO_2$ was separated from a stream of nitrogen gas using an adsorption mat, approximately 0.05 inches thick, of the type described above in Example 1. The weight of the mat was 0.29 grams. The velocity of the gas feed was 17.4 ft./min., the feed concentration (vol. % $SO_2$) was 0.81, and the adsorbate feed rate was 0.045 grams/min. Two test cycles were run under these conditions. In the adsorption half cycle of the first run, the breakthrough capacity was 0.013 grams/mat and the saturation capacity was 0.024 grams/mat. During the desorption half cycle of the first run, 82% of the adsorbate that had been adsorbed in the mat at breakthrough was desorbed. In the adsorption half cycle of the second run, the breakthrough capacity was 0.011 grams/mat and the saturation capacity was 0.021 grams/mat. The desorption half cycle of the second run desorbed 85% of the adsorbate that had been adsorbed in the mat at breakthrough. The foregoing results show that the adsorption mat of the present invention comprising glass fibers and polymer micro-bits, without any particulate additive, are effective in separating $SO_2$ from a gas stream.

EXAMPLE 8

A series of test cycles were run in which $SO_2$ was separated from a stream of nitrogen gas using an adsorption mat, about 0.03 inches thick, of the type described in Example 5. The weight of the mat was 0.175 grams. The results of these runs are shown in the following table.

TABLE I

| Run No. | A | B | C | D | E | F |
|---|---|---|---|---|---|---|
| 1 | 15.5 | 0.091 | 0.0450 | 0.0240 | 0.0400 | 89 |
| 2 | 15.3 | 0.103 | 0.0800 | 0.0200 | 0.0440 | 88 |
| 3 | 22.7 | 0.104 | 0.0750 | 0.0252 | 0.0410 | 88 |
| 4 | 23.0 | 0.109 | 0.0800 | 0.0280 | 0.0440 | — |
| 5 | 23.0 | 0.030 | 0.0225 | 0.008 | 0.0100 | 81 |

A = Feed gas velocity (ft/min.)
B = Feed gas concentration (vol. % of adsorbate).
C = Adsorbate feed rate (grams/min)
D = Breakthrough capacity (grams/mat).
E = Saturation capacity (grams/mat).
F = % of adsorbate adsorbed at breakthrough that was desorbed in an equal desorption period.

EXAMPLE 9

Another series of test cycles similar to those reported in Example 8 were run using a double thickness of the adsorption mat of Example 5. The weight of the mat was 0.175 grams. The results of this second series of runs are set forth in the following table.

TABLE II

| Run No. | A | B | C | D | E | F |
|---|---|---|---|---|---|---|
| 1 | 25.0 | 0.028 | 0.0225 | 0.0090 | 0.0108 | 62 |
| 2 | 25.0 | 0.028 | 0.0225 | 0.0086 | 0.0106 | 72 |
| 3 | 24.8 | 0.029 | 0.0225 | 0.0079 | 0.0103 | 78 |
| 4 | 24.8 | 0.029 | 0.0225 | 0.0083 | 0.0104 | 81 |
| 5 | 24.8 | 0.029 | 0.0225 | 0.0081 | 0.0100 | 76 |
| 6 | 24.8 | 0.029 | 0.0225 | 0.0083 | 0.0104 | 83 |
| 7 | 24.8 | 0.029 | 0.0225 | 0.0083 | 0.0104 | 81 |
| 8 | 24.8 | 0.029 | 0.0225 | 0.0083 | 0.0104 | 83 |
| 9 | 24.8 | 0.029 | 0.0225 | 0.0081 | 0.0103 | 83 |
| 10 | 24.8 | 0.029 | 0.0225 | 0.0083 | 0.0104 | 85 |
| 11 | 24.8 | 0.029 | 0.0225 | 0.0081 | 0.0104 | 81 |
| 12 | 24.8 | 0.029 | 0.0225 | 0.0081 | 0.0104 | 81 |
| 13 | 24.8 | 0.029 | 0.0225 | 0.0090 | 0.0104 | 85 |
| 14 | 24.8 | 0.029 | 0.0225 | 0.0088 | 0.0103 | 87 |
| 15 | 24.8 | 0.029 | 0.0225 | 0.0077 | 0.0102 | 86 |
| 16 | 24.8 | 0.029 | 0.0225 | 0.0081 | 0.0101 | 84 |
| 17 | 24.2 | 0.114 | 0.090 | 0.0320 | 0.0480 | — |

A-F are the same as in Table I

The data in Tables I show that the breakthrough capacity increased with feed gas velocity, whereas the saturation capacity was independent thereof. This indicates that gas phase diffusion exerts a significant influence on mass transfer. From Table II, it appears that the saturation capacity of the mat is the same regardless of thickness, while the breakthrough capacity increases with an increase in mat thickness. Thus, the use of a second mat increased the breakthrough capacity by about 10 to 15%.

The data also show that the $SO_2$ adsorption capacity of the mat is directly proportional to the feed gas concentration. A drop in the adsorption capacity of the mat with cycling was observed only for the initial three to five cycles, after which the adsorption capacity remained relatively constant. It was also observed that when using essentially the same gas velocity for the desorption half cycle as was used for the adsorption half cycle, desorption is substantially the reverse of adsorption, in so far as time of treatment is concerned. In other words, substantially all of the adsorbate adsorbed at breakthrough is removed from the mat by desorption for a period of time equal to the time required to reach the breakthrough point. In this regard, the carbon-containing adsorption mats of this invention provide a more efficient way of separating contaminants from a gas stream, as compared, for example, to a bed of granular activated carbon. The period of time required to regenerate an activated carbon bed by desorption of a given amount of contaminant is considerably longer than the adsorption time for the same amount of contaminant. Another advantage of the carbon-containing filter mats of this invention over activated carbon beds is that the latter display a significant hysteresis effect i.e., less and less adsorbate is desorbed with each successive cycle, whereas with the former, there appears to be no loss in adsorption capacity with continued cycling.

In order to achieve complete regeneration of the saturation capacity of the mats of the present invention, it appears that a desorption time about 50% longer than the saturation time is required.

EXAMPLE 10

Benzene was separated from a stream of nitrogen gas using an adsorption mat of the type described in Example 5. The weight of the mat was 0.175 grams. A first series of test hes cycles was run using a mat approximately 0.03 inc thick. The results of these runs are set forth in Table III. A second and shorter series of test cycles was run using a double thickness of the same adsorption mat. The results of the second series of runs are set forth in Table IV.

TABLE III

| Run No. | A | B | C | D | E | F |
|---|---|---|---|---|---|---|
| 1 | 26.3 | 0.0092 | 0.0093 | 0.0044 | 0.0054 | 88 |
| 2 | 26.3 | 0.0092 | 0.0093 | 0.0047 | 0.0056 | 92 |
| 3 | 26.3 | 0.0092 | 0.0093 | 0.0042 | 0.0053 | 96 |
| 4 | 26.2 | 0.0091 | 0.0093 | 0.0047 | — | — |
| 5 | 26.2 | 0.0091 | 0.0093 | 0.0051 | 0.0060 | 93 |
| 6 | 26.2 | 0.0091 | 0.0093 | 0.0047 | 0.0058 | 94 |
| 7 | 26.2 | 0.0091 | 0.0093 | 0.0048 | 0.0060 | 88 |
| 8 | 26.2 | 0.0140 | 0.0123 | 0.0081 | 0.0092 | 89 |
| 9 | 26.2 | 0.0140 | 0.0123 | 0.0076 | 0.0088 | 92 |
| 10 | 26.2 | 0.0180 | 0.0123 | 0.0090 | 0.0114 | 87 |
| 11 | 16.2 | 0.0180 | 0.0061 | 0.0075 | 0.0110 | — |

A-F are the same as in Table I.

TABLE IV

| Run No. | A | B | C | D | E | F |
|---|---|---|---|---|---|---|
| 1 | 26.0 | 0.0093 | 0.0093 | 0.0093 | 0.0051 | 88 |
| 2 | 26.0 | 0.0093 | 0.0093 | 0.0048 | 0.0048 | 88 |
| 3. | 26.3 | 0.0093 | 0.0093 | 0.0048 | 0.0052 | 91 |

A-F are the same as in Table I.

The data in Tables III and IV indicate that the number of mats used has no effect on either the breakthrough capacity or the saturation capacity. As in the tests on $SO_2$, the adsorption capacity for benzene is directly proportional to the feed gas concentration. Unlike the $SO_2$ tests, however, the benzene cycling capacity appeared to remain reasonably constant throughout the tests. No initial drop in the cycling capacity was noted. The data of Tables III and IV also show that substantially all of the adsorbate adsorbed at breakthrough is removed from the mat by desorbing for a period of time equal to that required to reach the breakthrough point.

In these tests also, regeneration of the saturation capacity required a desorption time about 50% longer than the time required to reach saturation.

As can be seen from the test data of Tables I, II, III, and IV, the carbon-containing mats have a higher saturation capacity for benzene than for $SO_2$ by about 25%.

EXAMPLE 11

A series of test cycles were run in which carbon tetrachloride ($CCl_4$) was separated from a stream of nitrogen using a carbon containing adsorption mat of the type described Example 5. The weight of the mat was 0.175 grams. The results of these runs are set forth in tabular form as follows:

TABLE V

| Run No. | A | B | C | D | E | F |
|---|---|---|---|---|---|---|
| 1 | 21.1 | 0.0227 | 0.0356 | 0.0142 | 0.022 | 93 |
| 2 | 21.1 | 0.0227 | 0.0356 | 0.0142 | 0.023 | 92 |
| 3 | 21.1 | 0.0227 | 0.0356 | 0.0150 | 0.023 | 88 |
| 4 | 21.1 | 0.0168 | 0.0203 | 0.0110 | 0.0155 | 89 |

TABLE V-continued

| Run No. | A | B | C | D | E | F |
|---|---|---|---|---|---|---|
| 5 | 15.4 | 0.0300 | 0.0356 | 0.0180 | 0.0310 | 92 |

A-F are the same as in Table I.

The data set forth in Table V indicates that the adsorption capacity of the mat for CCl$_4$ is directly proportional to the feed gas concentration. As in the previous tests, there appears to be no loss in adsorption capacity with continued cycling. From these tests, it appears that the mass transfer rate for CCl$_4$ is slower than in the case of benzene adsorption.

EXAMPLE 12

Phenol was separated from a stream of nitrogen gas using an adsorption mat of the type described in Example 5. The weight of the mat was 0.175 grams. A first series of test cycles was run using a single-ply mat approximately 0.03 inches thick. The results of these runs are set forth below in Table VI. A second series of test cycles were run using a double-ply of the same carbon-containing mat. The result of the second series of runs are set forth below in Table VII.

TABLE VI

| Run No. | A | B | C | D | E | F |
|---|---|---|---|---|---|---|
| 1 | 25.0 | 0.014 | 0.0085 | 0.0085 | 0.035 | 40 |
| 2 | 25.0 | 0.014 | 0.0085 | 0.0085 | 0.035 | 45 |
| 3 | 25.0 | 0.014 | 0.0085 | 0.0068 | 0.035 | 43 |
| 4 | 25.0 | 0.010 | 0.0080 | 0.0056 | 0.025 | — |
| 5 | 25.0 | 0.010 | 0.0080 | 0.0055 | 0.025 | — |
| 6 | 25.0 | 0.010 | 0.0080 | 0.0057 | 0.025 | — |

A-F are the same as in Table I.

TABLE VII

| Run No. | A | B | C | D | E | F |
|---|---|---|---|---|---|---|
| 1 | 25.0 | 0.014 | 0.013 | 0.0091 | 0.035 | — |
| 2 | 25.0 | 0.014 | 0.013 | 0.0088 | 0.035 | — |
| 3 | 25.0 | 0.014 | 0.013 | 0.0075 | 0.035 | — |
| 4 | 25.0 | 0.014 | 0.013 | 0.0070 | 0.035 | — |

A-F are the same as in Table I.

Some difficulty was experienced in accurately measuring the various parameters during the phenol test, which is believed due to adsorbate condensation in the lines. From the data that was obtained, it appears that the breakthrough capacity is somewhat greater for phenol than for the other organic substances tested, whereas the relative saturation capacity is substantially greater. However, the adsorption rate for phenol is rather slow, as evidenced by excessively long times required to reach saturation. It also appears from these tests that the mat's phenol adsorption capacity is a function of the number of cycles, perhaps because of incomplete desorption. Desorption of phenol appears to be significantly slower than for the other organic adsorbates tested. After a normal desorption period, only 55% of the adsorbate adsorbed at the breakthrough point and 15% of the adsorbate adsorbed at full saturation capacity were desorbed.

While the invention has been explained by detailed description of certain specific embodiments various substitutions or modifications can be made in any of these embodiments within the scope of the appended claims, which are intended to cover also equivalents of these embodiments.

I claim:

1. A method for separating undesired substances from a gas or vapor containing same, said method comprising passing a stream of said gas or vapor having said undesirable substances entrained therein through a porous medium comprising glass fibers from about 6.35 millimeters long to below a length at which said fibers are prone to roping, and from about 3 to 12 microns in diameter, intermixed with micro-bits of any of an expanded, thermoplastic styrene-polymer, or lower polyolefin, which is the polymer of an ethylenically unsaturated hydrocarbon monomer having from 2 to 6 carbon atoms, each said polymer being non-brittle in its initial expanded form, said polymer micro-bits being from about 40 to about 325 microns long and from about 20 to about 325 microns wide, substantially completely free of intact cells of the expanded polymer from which said micro-bits were produced, substantially without any uniformity in outline of the individual micro-bit particles, and having a density from about 85 percent of, to about substantially the same as, the specific unexpanded polymer from which there was provided the aforesaid expanded thermoplastic polymer from which said micro-bits were produced, said intermixed glass fibers and polymer micro-bits being permeable to a gaseous and-/or vaporous fluid stream and held together in sheet or elongated web form by a binding agent selected from (a) a compatible organic binder insoluable in cold water and soluble in hot water and inert to the glass fibers, the micro-bits and any other constituent of said medium, as well as any gas or vapor or entrained droplets or aerosols and fine particles that are to contact said medium, or (b) a cobeat of cotton fibers and any of said micro-bits, or a mixture of binding agents (a) and (b), said binding agent being distributed throughout the micro-bits and glass fibers so as to hold said micro-bits and glass fibers together in said sheet or elongated web form without destroying the permeability thereof; the constituents being in the following proportions, by weight of said medium:
 (i) from about 2 to about 50% of said micro-bits;
 (ii) from about 2% to about 10% of said binding agent when the organic binder is used, and from about 5.8% to about 11% of said binding agent when the cobeat binder is used, and
 (iii) the balance of said medium being made up of said glass fibers; said medium having tensile strength from about 0.9 to about 5.3 kilograms per centimeter, and thereby separating said undesired substances from said gas or vapor.

2. The method claimed in claim 1 wherein said polymer micro-bits of said porous medium are polystyrene.

3. The method claimed in claim 1 wherein the binding agent for said porous medium is selected from polyvinyl alcohol at least 98% hydrolyzed, a melamine-formaldehyde resin, or a mixture thereof.

4. The method claimed in claim 1 wherein said porous medium includes, based on the overall weight of said medium, (i) a particulate additive from the group consisting of activated carbon particles, zeolite particles, and gas-vapor adsorbent, crystalline molecular sieve particles, the amount of said additive being from about 2% to less than that amount at which appreciable dusting of said carbon, or zeolite or molecular sieve particles from said medium occurs, (ii) from about 5% to about 10% of a fiber-forming polyester terephthalate, and (iii) from about 2% to about 30% of said cobeat.

5. The method claimed in claim 4 wherein activated carbon particles constitute the particulate additive in said porous medium.

6. The method claimed in claim 4 wherein crystalline molecular sieve particles constitute the particulate additive in said porous medium.

7. The method claimed in claim 6 wherein the molecular sieve particles are silicalite.

8. A method for separating one or more substances from the group consisting of sulfur dioxide, benzene, carbon tetrachloride and phenol from a gas or vapor containing same, said method comprising passing a stream of said gas or vapor having one or more of said substances entrained therein through a porous medium comprising glass fibers from about 6.35 millimeters long to below a length at which said fibers are prone to roping, and from about 3 to 12 microns in diameter, intermixed with micro-bits of any of an expanded, thermoplastic styrene-polymer, or lower polyolefin, which is the polymer of an ethylenically unsaturated hydrocarbon monomer having from 2 to 6 carbon atoms, each said polymer being non-brittle in its initial expanded form, said polymer micro-bits being from about 40 to about 325 microns long and from about 20 to about 325 microns wide, substantially completely free of intact cells of the expanded polymer from which said micro-bits were produced, substantially without any uniformity in outline of the individual micro-bit particles, and having a density from about 85 percent of, to about substantially the same as, the specific unexpanded thermoplastic polymer from which there was provided the aforesaid expanded thermoplastic polymer from which said micro-bits were produced, said intermixed glass fibers and polymer micro-bits being permeable to a gaseous and/or vaporous fluid stream and held together in sheet or elongated web form by a binding agent selected from (a) a compatible organic binder insoluble in cold water and soluble in hot water and inert to the glass fibers, the micro-bits and any other constituent of said medium, as well as any gas or vapor or entrained droplets or aerosols and fine particles that are to contact said medium, or (b) a cobeat of cotton fibers and any of said micro-bits, or a mixture of binding agents (a) and (b), said binding agent being distributed throughout the micro-bits and glass fibers so as to hold said micro-bits and glass fibers together in said sheet or elongated web form without destroying the permeability thereof; said medium including a particulate adsorbent material selected from the group consisting of activated carbon particles, zeolite particles and gas-vapor adsorbent crystalline molecular sieve particles; the constituents being in the following proportions, by weight of said medium:

(i) about 2 to about 50% of said micro-bits;
(ii) from about 2% to about 10% of said binding agent when the organic binder is used, and from about 5.8% to about 11% of said binding agent when the cobeat binder is used;
(iii) from about 2% of said particulate adsorbent material to less than that amount at which appreciable dusting of the particulate material from said medium occurs; and
(iv) the balance of said medium being made up of said glass fibers;

said medium having tensile strength from about 0.9 to about 5.3 kilograms per centimeter, and thereby separating said substances from said gas or vapor.

9. The method claimed in claim 8 wherein said polymer micro-bits of said porous medium are polystyrene.

10. The method claimed in claim 8 wherein the binding agent for said porous medium is selected from polyvinyl alcohol at least 98% hydrolyzed, a melamine-formaldehyde resin, or a mixture thereof.

11. The method claimed in claim 8 wherein said porous medium includes, based on the overall weight of said medium, from about 5% to about 10% of a fiber-forming polyester terephthalate and from about 2% to about 30% of said cobeat.

12. The method claimed in claim 11 wherein activated carbon particles constitute the particulate additive in said porous medium.

13. The method claimed in claim 11 wherein crystalline molecular sieve particles constitute the particulate additive in said porous medium.

14. The method claimed in claim 13 wherein the molecular sieve particles are silicalite.

15. A gas-vapor treating mat which comprises, glass fibers from about 6.35 millimeters long to below a length at which said fibers are prone to roping, and from about 3 to 12 microns in diameter, intermixed with micro-bits of any of an expanded, thermoplastic styrene-polymer, or lower polyolefin, which is the polymer of an ethylenically unsaturated hydrocarbon monomer having from 2 to 6 carbon atoms, each said polymer being non-brittle in its initial expanded form, a cobeat of cotton fibers and any of said microbits, silicalite molecular sieve particles, and a fiber-forming polyester terephthalate; said polymer micro-bits being from about 40 to about 325 microns long and from about 20 to about 325 microns wide, substantially completely free of intact cells of the expanded polymer from which said micro-bits were produced, substantially without any uniformity in outline of the individual micro-bit particles, and having a density from about 85 percent of, to about substantially the same as, the specific unexpanded polymer from which there was provided the aforesaid expanded thermoplastic polymer from which said micro-bits were produced, said intermixed glass fibers, polymer micro-bits and other mat contituents being permeable to a gaseous and/or vaporous fluid stream and held together in sheet or elongated web form by a compatible organic binder insoluble in cold water and soluble in hot water and inert to the glass fibers, the micro-bits and other mat constituents, as well as any gas or vapor or entrained droplets or aerosols and fine particles that are to contact said mat, said binding agent being distributed throughout the micro-bits, glass fibers and other constituents so as to hold them together in said sheet or elongated web form without destroying the permeability thereof; the constituents being in the following proportions, by weight of said mat:

(i) from about 2 to about 50% of said micro-bits;
(ii) from about 2% to about 10% of said binding agent;
(iii) from about 2% to about 30% of said cobeat;
(iv) from about 2% of said silicalite particles to less than that amount at which appreciable dusting of said particles from said mat occurs;
(v) from about 5% to about 10% of said polyester terephthalate; and
(vi) the balance of the mat being made up of said glass fibers;

said mat having tensile strength from about 0.9 to about 5.3 kilograms per centimeter.

16. The mat claimed in claim 15 wherein the binding agent is selected from polyvinyl alcohol at least 98% hydrolyzed, a melamine-formaldehyde resin, or a mixture thereof.

17. The mat claimed in claim 15 wherein said polymer micro-bits are polystyrene.

* * * * *

UNITED STATES PATENT AND TRADEMARK OFFICE
CERTIFICATE OF CORRECTION

PATENT NO. : 4,344,775
DATED : August 17, 1982
INVENTOR(S) : Max Klein

It is certified that error appears in the above-identified patent and that said Letters Patent are hereby corrected as shown below:

Column 1, line 50, "of" should read --or--;
Column 3, line 38, insert "and" before "9.535mm";
Column 4, line 20, "mode" should read --model--;
Column 4, line 31, "salt-shaped" should read --slat-shaped--;
Column 15, line 14, "provied" should read --provided--;
Column 15, line 19, "guage" should read --gauge--;

Column 18, line 6, delete "hes";
Column 18, line 7, "inc" should read --inches--;
Column 22, line 37, "contituents" should read --constituents--.

Signed and Sealed this

Fourteenth Day of December 1982

[SEAL]

Attest:

Attesting Officer

GERALD J. MOSSINGHOFF

Commissioner of Patents and Trademarks